(12) United States Patent
Oshitani et al.

(10) Patent No.: US 7,823,400 B2
(45) Date of Patent: Nov. 2, 2010

(54) TWO-STAGE DECOMPRESSION EJECTOR AND REFRIGERATION CYCLE DEVICE

(75) Inventors: Hiroshi Oshitani, Toyota (JP); Yoshiaki Takano, Kosai (JP); Mika Gocho, Obu (JP)

(73) Assignee: Denso Corporation, Kariya (JP)

( * ) Notice: Subject to any disclaimer, the term of this patent is extended or adjusted under 35 U.S.C. 154(b) by 374 days.

(21) Appl. No.: 12/157,350

(22) Filed: Jun. 10, 2008

(65) Prior Publication Data

US 2009/0013704 A1 Jan. 15, 2009

(30) Foreign Application Priority Data

Jun. 11, 2007 (JP) .............................. 2007-153806

(51) Int. Cl.
*F25B 1/06* (2006.01)
*F04F 5/22* (2006.01)
(52) U.S. Cl. ............................. 62/191; 62/500; 417/168
(58) Field of Classification Search ................... 62/191, 62/500, 86, 170, 528; 417/168, 151
See application file for complete search history.

(56) References Cited

U.S. PATENT DOCUMENTS 7,178,359 B2 2/2007 Oshitani et al.
7,254,961 B2 8/2007 Oshitani et al.

FOREIGN PATENT DOCUMENTS

JP 2005-265223 9/2005

*Primary Examiner*—Chen-Wen Jiang
(74) *Attorney, Agent, or Firm*—Harness, Dickey & Pierce, PLC

(57) ABSTRACT

A two-stage decompression ejector includes a variable throttle mechanism having a first throttle passage for decompressing a fluid and a valve body for changing a throttle passage area of the first throttle passage, a nozzle having therein a second throttle passage for further decompressing the fluid decompressed by the variable throttle mechanism, and a suction portion for drawing a fluid by a suction effect of a high-velocity jet fluid from the nozzle. The formula of $0.07 \leq Vo \times S/vn \leq 0.7$ is satisfied, in which Vo is an intermediate-pressure space volume (mm$^3$) from an outlet of the variable throttle mechanism to an inlet of the second throttle passage, S is a throttle passage sectional area (mm$^2$) of a minimum passage sectional area portion of the second throttle passage, and vn is a flow velocity (mm/s) of the fluid passing through the minimum passage sectional area portion.

5 Claims, 8 Drawing Sheets

FROM BRANCH PORTION

FROM SECOND EVAPORATOR

FROM BRANCH PORTION

FROM SECOND EVAPORATOR

TWO-STAGE DECOMPRESSION EJECTOR AND REFRIGERATION CYCLE DEVICE

CROSS REFERENCE TO RELATED APPLICATION

This application is based on Japanese Patent Application No. 2007-153806 filed on Jun. 11, 2007, the contents of which are incorporated herein by reference in its entirety.

FIELD OF THE INVENTION

The present invention relates to a two-stage decompression ejector for decompressing and expanding a fluid by using two throttles, and a refrigeration cycle device including the two-stage decompression ejector.

BACKGROUND OF THE INVENTION

A refrigeration cycle device is conventionally proposed which uses an ejector as decompression means for decompressing and expanding refrigerant.

This kind of ejector-type refrigeration cycle device is designed to draw refrigerant flowing from an evaporator by a suction effect of a refrigerant flow jetted at a high velocity from a nozzle of an ejector, and to increase a refrigerant pressure to be drawn into a compressor by a diffuser of the ejector. Thus, the refrigerant pressure to be drawn into the compressor is increased to be higher than a refrigerant evaporation pressure of the evaporator.

Thus, the ejector-type refrigeration cycle device can decrease a driving power of the compressor, thereby improving a coefficient of performance (COP) of the cycle as compared to a normal refrigeration cycle in which a refrigerant evaporation pressure of the evaporator is identical to a suction refrigerant pressure of the compressor.

In order to further improve the COP, JP-A-2005-265223 proposes an ejector-type refrigeration cycle device to which a two-stage decompression ejector for decompressing and expanding refrigerant by two throttles is applied.

The two-stage decompression ejector includes a box type thermal expansion valve serving as an upstream side throttle and an ejector with a nozzle serving as a downstream side throttle, which are integrally connected together.

A high-pressure refrigerant is decompressed and expanded by the thermal expansion valve into an intermediate-pressure refrigerant forming boiling nuclei. Further, the intermediate-pressure refrigerant is decompressed and expanded by the nozzle into a low-pressure refrigerant. Thus, it can promote boiling of the refrigerant under reduced pressure in the nozzle, thereby improving a nozzle efficiency of the ejector.

The term "nozzle efficiency" as used herein means an energy conversion efficiency in converting a pressure energy of refrigerant into a kinetic energy thereof. Thus, the improvement of the nozzle efficiency can increase a flow velocity of the refrigerant injected from the nozzle thereby to increase an amount of energy recovered by the ejector. As a result, the refrigerant pressure is increased by a diffuser, thereby improving the COP.

The inventors of the present application have found from the examination and studied that when the ejector-type refrigeration cycle device as disclosed in JP-A-2005-265223 is actually operated, low-frequency abnormal noise is generated from the ejector on start-up of the cycle.

SUMMARY OF THE INVENTION

In view of the foregoing problems, it is an object of the invention to suppress low-frequency abnormal noise from a two-stage decompression ejector at a start-up of an ejector-type refrigeration cycle device.

The present invention has been made based on the following analytical findings. The inventors of the present application have measured changes with time in a low-pressure side refrigerant pressure Ps, a high-pressure side refrigerant pressure Pd, and a noise level NL generated by a two-stage decompression ejector from a start-up time of an ejector-type refrigeration cycle device disclosed in JP-A-2005-265223 (Comparative Example).

FIG. 8 shows the measurement result of the comparative example. As can be seen from FIG. 8, on start of the ejector-type refrigeration cycle device of the comparative example, the low-pressure side refrigerant pressure Ps starts to decrease, while the high-pressure side refrigerant pressure Pd starts to increase, and further the noise level NL also increases. It is found that the increase in noise level NL is caused by high-frequency noise, such as frictional noise, generated when the refrigerant passes through the cycle.

Thereafter, while the low-pressure side refrigerant pressure Ps gradually decreases and the high-pressure side refrigerant pressure Pd gradually increases (specifically, after the start-up of the cycle, for example, after about 23 seconds), there is a timing at which the noise level NL becomes highest as indicated by the two-dot chain line in FIG. 8.

The inventors of the present application have analyzed a frequency of the highest noise, and thus found that the noise is low-frequency noise of about 180 Hz as shown in FIG. 9. That is, the low-frequency noise of about 180 Hz was found to be low-frequency abnormal noise generated from the ejector on the start-up of the cycle.

The inventors of the present application have measured pressure pulsation of an intermediate pressure in a space (hereinafter referred to as an intermediate-pressure space) leading from an outlet of a variable throttle mechanism of a thermal expansion valve to an inlet of a minimum passage sectional area portion (throat portion) of a nozzle at the timing when the noise level NL becomes highest, and analyzed the frequency of the pressure pulsation. As a result, as shown in FIG. 10, the pressure pulsation is found to exist at a frequency of about 180 Hz that is the same as that of the noise.

In view of the above point, the inventors of the application have focused on resonance between vibration of a valve body of the thermal expansion valve and vibration of the refrigerant in the intermediate-pressure space as one of causes for generating the low-frequency abnormal noise. That is, after the start-up of the cycle, when a difference between the pressure of the intermediate-pressure refrigerant and the pressure of the high-pressure liquid-phase refrigerant on the upstream side of the variable throttle mechanism of the thermal expansion valve is equal to or more than a predetermined value, air bubbles (boiling nuclei) are formed in the intermediate-pressure refrigerant.

Since the air bubbles have volumes changed unstably, the formation of the air bubbles vibrates the valve body. Furthermore, the existence of air bubbles whose volumes are changed in the intermediate-pressure space may cause the intermediate-pressure space to act as one kind of a damper space. When a frequency of vibration of the valve body is identical to a resonance frequency of the intermediate-pressure space, resonance abnormal noise may be generated.

The inventors have organized respective parameters taking into consideration an intermediate-pressure space volume Vo (mm$^3$), a throttle passage area S (mm$^2$) of the throat portion of the nozzle used as a parameter indicative of an amount of existence of air bubbles in the intermediate-pressure space, and a flow velocity vn (mm/s) of refrigerant passing through the throat portion. As a result, the inventors of the present application have found that the pressure pulsation of the intermediate-pressure refrigerant changes with a change in Vo×S/vn.

The details of the variation in the pressure pulsation will be described with reference to FIG. 11. In FIG. 11, a lateral axis indicates Vo×S/vn. Further, in FIG. 11, a longitudinal axis on a lower stage side indicates a difference between pressure pulsation in normal operation and pressure pulsation in occurrence of low-frequency abnormal noise on startup. In FIG. 11, a longitudinal axis on an upper state side indicates a ratio of the increase in pressure with respect to ΔP0 when an amount of increase in pressure at a diffuser of the ejector is designated by ΔP0 at Vo×S/vn of 0.04 (Vo×S/vn=0.04).

As shown in FIG. 11, the pressure pulsation of the intermediate-pressure refrigerant is reduced with increasing Vo×S/vn thereby to decrease an amount of increase in pressure at the diffuser. In particular, when Vo×S/vn≧0.07, the pressure pulsation of the intermediate pressure is effectively reduced. In contrast, the increase in pressure is reduced due to reduction or extinction of air bubbles (boiling nuclei) existing in the intermediate-pressure space, thereby reducing an ejector efficiency. When Vo×S/vn≦0.7, it can prevent the amount of increase in pressure from greatly decreasing.

In view of the above point, according to a first aspect of the present invention, a two-stage decompression ejector includes: a variable throttle mechanism including a first throttle passage configured to decompress and expand a fluid and a valve body configured to change a throttle passage area of the first throttle passage; a nozzle having therein a second throttle passage, the second throttle passage being adapted to further decompress and expand the fluid decompressed by the variable throttle mechanism; and a suction portion configured to draw a fluid by a suction effect of a jet-flow fluid ejected at a high velocity from the nozzle. Furthermore, the two-stage decompression ejector is configured to satisfy the following formula:

$$0.07 \leq Vo \times S/vn \leq 0.7$$

where Vo is an intermediate-pressure space volume (unit: mm$^3$) that is a volume from an outlet of the variable throttle mechanism to an inlet of the second throttle passage, S is a throttle passage area (unit: mm$^2$) that is a passage sectional area of a minimum passage sectional area portion of the second throttle passage, and vn is a flow velocity (unit: mm/s) of the fluid passing through the minimum passage sectional area portion.

Because Vo×S/vn≧0.07, it can suppress the low-frequency abnormal noise generated at the two-stage decompression ejector on startup of the cycle when the two-stage decompression ejector is applied to a refrigeration cycle device. Additionally, when Vo×S/vn≦0.7, it can prevent the drastic reduction in the ejector efficiency, thereby preventing the COP from being reduced.

For example, the first throttle passage and the second throttle passage may be formed in a fluid passage of the nozzle, and the valve body may be configured to change only a throttle passage area of a minimum passage sectional portion in the first throttle passage.

Thus, the first throttle passage and the second throttle passage can be formed in the one nozzle, and thereby it is possible to make the two-stage decompression ejector compact.

Alternatively, the variable throttle mechanism may include a throttle passage of a thermal expansion valve, and a valve body. Accordingly, the two-stage decompression ejector can be achieved, for example, by a simple structure in which a box type thermal expansion valve is integrally connected to the ejector whose minimum refrigerant passage area of the nozzle is not changed.

The variable throttle mechanism may include an electric variable throttle mechanism adapted to be capable of electrically controlling an operation of the valve body.

According to a second aspect of the present invention, an ejector-type refrigeration cycle device includes the two-stage decompression ejector according to the first aspect of the present invention. Accordingly, the low-frequency abnormal noise generated at the two-stage decompression ejector on startup of the ejector-type refrigeration cycle device can be prevented.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

First Embodiment

Figure 1:
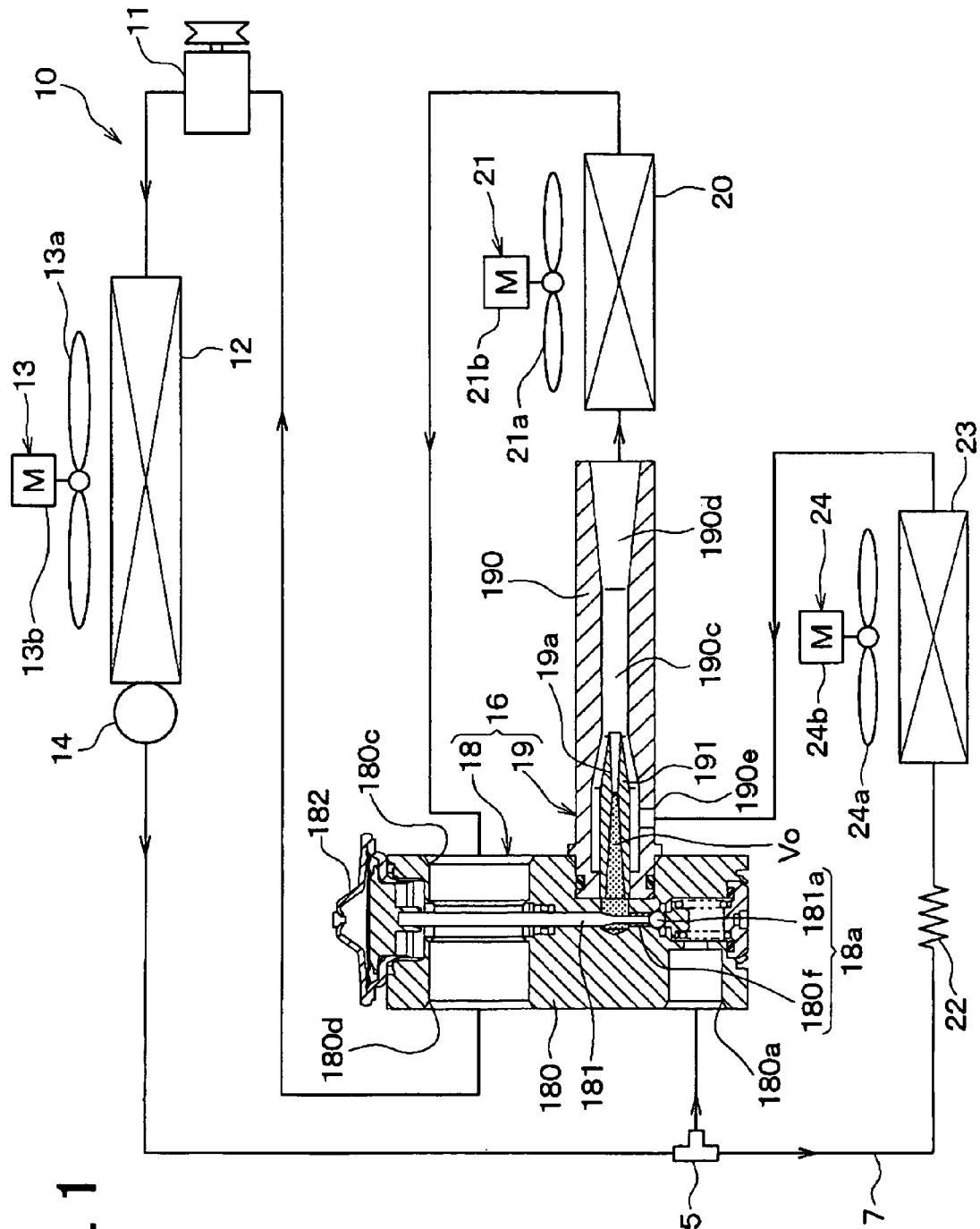
FIG. 1 is a diagram showing the entire configuration of an ejector-type refrigeration cycle device according to a first embodiment of the invention.
Figure 2:
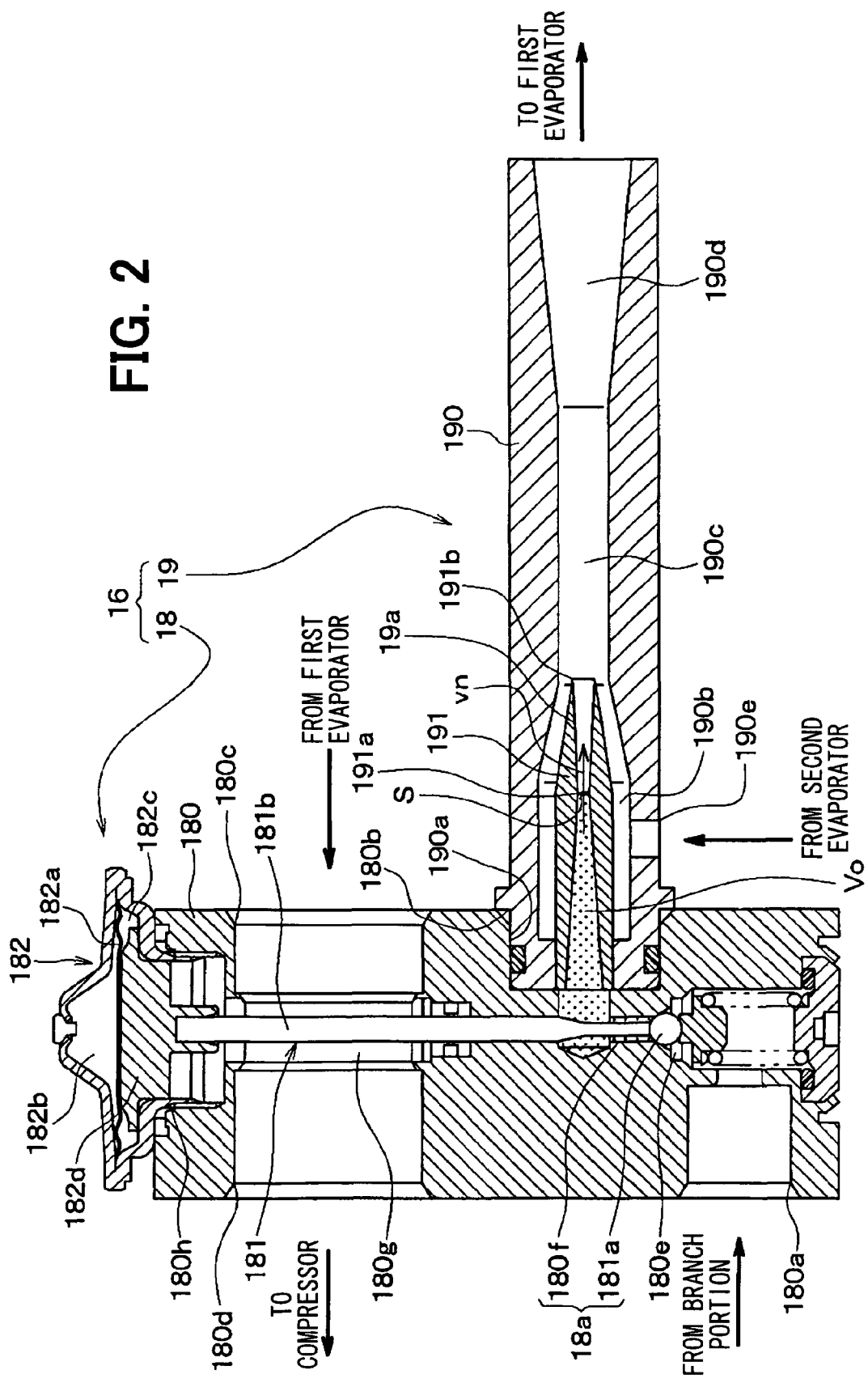
FIG. 2 is a sectional view of a two-stage decompression ejector in the first embodiment.

A first embodiment of the present invention will be described below with reference to FIGS. 1 and 2. In the present embodiment, an ejector-type refrigeration cycle device 10 including a two-stage ejector 16 of the invention is applied to an air conditioner for a vehicle. FIG. 1 shows the entire configuration of the ejector-type refrigeration cycle device 10. In the ejector-type refrigeration cycle device 10, a compressor 11 for sucking and compressing refrigerant is rotatably driven by a vehicle engine (not shown) by an electromagnetic clutch, a belt, or the like.

As the compressor 11, may be used either of a variable displacement compressor for being capable of adjusting a refrigerant discharge capacity depending on a change in discharge capacity, or a fixed displacement compressor for adjusting a refrigerant discharge capacity by changing an operating efficiency of the compressor by intermittent connection of the electromagnetic clutch. The use of an electric compressor as the compressor 11 can adjust the refrigerant discharge capacity by adjustment of the number of revolutions of an electric motor.

A radiator 12 is connected to the refrigerant discharge side of the compressor 11. The radiator 12 is adapted to exchange heat between high-pressure refrigerant discharged from the compressor 11 and outside air (i.e., air outside a vehicle compartment) blown by an electric blower 13, thereby cooling the high-pressure refrigerant. The electric blower 13 is adapted to rotatably drive a known centrifugal multiblade fan 13a by use of an electric motor 13b.

The ejector-type refrigeration cycle device 10 of the present embodiment constitutes a subcritical cycle whose high-pressure side refrigerant pressure does not exceed the critical pressure of the refrigerant, using a normal flon-based refrigerant as the refrigerant. Thus, the radiator 12 serves as a condenser for condensing the refrigerant.

A receiver 14 is connected to the downstream side of the radiator 12. The receiver 14 is a gas-liquid separator for separating the refrigerant flowing from the radiator 12 into liquid and vapor phases, and for storing therein the liquid-phase refrigerant.

A branch portion 15 for branching a flow of refrigerant is connected to an outlet for a liquid-phase refrigerant of the receiver 14. The branch portion 15 can be constructed of a so-called three-way connector with one refrigerant inlet and two refrigerant outlets. A plurality of refrigerant passages may be provided in a metallic or resin block having a rectangular parallelepiped.

Furthermore, one of the refrigerant outlets of the branch portion 15 is connected to a high-pressure refrigerant inlet 180a of the two-stage decompression ejector 16, and the other outlet is connected to a refrigerant suction port 190e of the two-stage decompression ejector 16 via a refrigerant branch passage 17.

The two-stage decompression ejector 16 will be described based on FIG. 2. FIG. 2 is a sectional view of the two-stage decompression ejector 16. The two-stage decompression ejector 16 is constructed by integrally connecting a known box type thermal expansion valve 18 with the ejector 19.

First, the thermal expansion valve 18 serves as decompression means for constituting a variable throttle mechanism 18a, which is a throttle disposed on the upstream side of the two-stage decompression ejector 16. Specifically, the thermal expansion valve 18 is an internal equalizing expansion valve adapted to detect a superheat degree of the refrigerant on the outlet side of a first evaporator 20 based on the temperature and pressure of the refrigerant on the outlet side of the evaporator 20 to be described. The thermal expansion valve 18 is also adapted to adjust a throttle passage area (refrigerant flow amount) of the variable throttle mechanism 18a such that the superheat degree of the refrigerant on the outlet side of the first evaporator 20 is within a predetermined range.

The thermal expansion valve 18 includes a housing 180, an operation rod 181, a temperature sensing portion 182, and the like. The housing 180 is formed by punching a hole in a metallic block having a prism or cylindrical shape. The housing 180 forms an outer shell of the thermal expansion valve 18. The housing 18 is provided with the refrigerant inlets and outlets 180a to 180d, a valve chamber 180e, a first throttle passage 180f, a communication chamber 180g, and an attachment hole 180h for attaching a temperature sensing portion 182, and the like.

The refrigerant inlets and outlets 180a to 180d formed include a high-pressure refrigerant inlet 180a for allowing one refrigerant flow branched by the branch portion 15 to flow thereinto, and an intermediate-pressure refrigerant outlet 180b for allowing the refrigerant to flow out to an inlet side of a nozzle 191 of the ejector 19. The inlets and outlets also include a low-pressure refrigerant inlet 180c for allowing the refrigerant on the outlet side of the first evaporator 20 to flow thereinto to be described later, and a low-pressure refrigerant outlet 180d for allowing the refrigerant to flow out to the suction side of the compressor 11.

The high-pressure refrigerant inlet 180a is in communication with the valve chamber 180e for accommodating therein a valve body 181a of the operation rod 181. The intermediate-pressure refrigerant outlet 180b is also in communication with the valve chamber 180e via the first throttle passage 180f. The first throttle passage 180f is to decompress and expand the refrigerant flowing from the high-pressure refrigerant inlet 180a to guide it to the intermediate-pressure refrigerant outlet 180b.

The operation rod 181 is provided with the spherical valve body 181a formed on one end of the rod 181, and a temperature sensing rod 181b connected to a disc-like member 182d of the temperature sensing portion 182 to be described later. The valve body 181a is displaced in the axial direction of the operation rod 181 (temperature sensing rod 181b) thereby to adjust a throttle passage area of the first throttle passage 180f. Thus, in the present embodiment, the first throttle passage 180f and the valve body 181a constitute the variable throttle mechanism 18a.

The axial direction of the operation rod 181 extends through the communication chamber 180g and the attachment hole 180h from the valve chamber 180e. The communication chamber 180g is a communication space for establishing communication among the low-pressure refrigerant inlet 180c, the low-pressure refrigerant outlet 180d, and the attachment hole 180h. Thus, the refrigerant on the outlet side of the first evaporator 20 flowing thereinto from the low-pressure refrigerant inlet 180c is guided to the temperature sensing portion 182 via the attachment hole 180h, while flowing from the low-pressure refrigerant outlet 180d.

The temperature sensing portion 182 serves as a superheat-degree actuated mechanism that is operated according to the temperature and pressure of the refrigerant on the outlet side of the first evaporator 20. Specifically, the temperature sensing portion 182 is provided with a first pressure chamber 182b and a second pressure chamber 182c partitioned by a metallic or resin diaphragm 182a. The first pressure chamber 182b is sealed with the refrigerant charged thereinto. The second pressure chamber 182c is in communication with the communication chamber 180g via the attachment hole 180h.

The metallic disc-like member 182d is bonded to the side of the diaphragm 182a on the second pressure chamber 182c side. As mentioned above, the disc-like member 182d is connected with the temperature sensing rod 181b of the operation rod 181. Thus, the temperature of refrigerant on the outlet side of the first evaporator 20 flowing into the communication chamber 180g is transmitted to the first pressure chamber 182b via the temperature sensing rod 181b and the disc-like member 182d.

Thus, an internal pressure in the first pressure chamber 182b becomes a saturated vapor pressure of the refrigerant according to the temperature of the refrigerant on the outlet side of the first evaporator 20. In contrast, the pressure in the second pressure chamber 182c becomes a refrigerant pressure on the outlet side of the first evaporator 20. Thus, the diaphragm 182a is displaced according to a difference between a load applied by the internal pressure of the first pressure chamber 182b and a load applied by the pressure of the second pressure chamber 182c. Further, the operation rod 181 (valve body 181a) is displaced in cooperation with the displacement of the diaphragm 182a.

For example, when the temperature (the degree of superheat) of the refrigerant on the outlet side of the first evaporator 20 increases, the heat at this temperature is transmitted to the refrigerant in the first pressure chamber 182b to increase the internal pressure (saturated vapor pressure) in the first pressure chamber 182b. This leads to an increase in load due to the increased internal pressure of the first pressure chamber 182b, allowing the diaphragm 182a to be displaced in a direction for increasing an area of an opening of the first throttle passage 180f.

Thus, the flow amount of the refrigerant flowing from the intermediate-pressure refrigerant outlet 180b is increased, resulting in an increase in flow amount of the refrigerant supplied to the first evaporator 20 via the ejector 19, and thus in a decrease in temperature (superheat degree) of the refrigerant on the outlet side of the first evaporator 20. The thermal expansion valve 18 adjusts the displacement of the valve body 181a so as to adjust a throttle passage area (refrigerant flow amount) of the first throttle passage 181f such that the superheat degree of the refrigerant on the outlet side of the first evaporator 20 is within the predetermined range.

The ejector 19 serves as decompression means having a second throttle passage 19a that acts as a downstream side throttle for decompressing and expanding the intermediate-pressure refrigerant decompressed and expanded by the thermal expansion valve 18. The ejector 19 also serves as refrigerant circulation means for circulation of the refrigerant by a suction effect of the refrigerant injected at a high velocity.

The ejector 19 includes a body 190 and the nozzle 191. The body 190 is formed of metal (for example, aluminum) in a substantially cylindrical shape to form the outer shell of the ejector 19.

The body 190 has the thermal expansion valve 18 and a connection portion 190a formed on one end side of an outer periphery of the body. A nozzle chamber 190b for accommodating therein the nozzle 191, a mixing portion 190c, a diffuser 190d, and also a refrigerant suction port 190e penetrating the body 190 are formed in the body 190.

The connection portion 190a is fitted into the intermediate-pressure refrigerant outlet 180b of the thermal expansion valve 18, causing the thermal expansion valve 18 to be connected to the ejector 19. Thus, the refrigerant flowing from the intermediate-pressure refrigerant outlet 180b flows into the nozzle 191 of the ejector 19. A gap between the connection portion 190a and the intermediate-pressure refrigerant outlet 180b is sealed by sealing means, such as an O-ring, and the refrigerant does not leak from the gap.

The nozzle 191 is formed of metal (for example, stainless alloy) in a substantially cylindrical shape to have a conical tapered portion on one end in the flow direction of the refrigerant. Specifically, a so-called Laval nozzle is used, in which an inner diameter of a refrigerant passage is gradually reduced along the flow direction of the refrigerant and then gradually enlarged after the throat portion 191a having the minimum refrigerant passage sectional area.

Thus, in the present embodiment, the refrigerant passage on the downstream side of the throat portion 191a forms the second throttle passage 19a. It is apparent that a convergent nozzle whose refrigerant passage sectional area does not change may be employed as the nozzle portion 191 on the downstream side of the throat portion 191a.

The nozzle 191 is fixed to the nozzle chamber 190b of the body 190 by a method, such as press fitting, thereby preventing the refrigerant from leaking from a press fitting portion (fixing portion). As long as the refrigerant is prevented from leaking from the fixing potion, any other bonding means, including adhesion, welding, pressure welding, soldering, and the like, may be used for bonding and fixing.

The refrigerant suction port 190e is a suction port for sucking the refrigerant on the downstream side of a second evaporator 23 to be described later into the body 190. The refrigerant suction port 190e is disposed on the outer peripheral side of the nozzle 191, and in communication with a refrigerant injection port 191b formed in the most downstream part of the nozzle 191 in the refrigerant flow direction via the nozzle chamber 190b.

The mixing portion 190c is formed inside the substantial center part of the body 190 in the axial direction. The mixing portion 190c is a space for mixing the refrigerant injected at a high velocity from the refrigerant injection port 191b with the refrigerant drawn from the refrigerant suction port 190e. The mixing portion 190c is disposed on the downstream side of the refrigerant injection port 191b and the refrigerant suction port 190e.

The diffuser 190d is a booster disposed on the downstream side of the mixing portion 190c and adapted to decelerate the refrigerant flow, thereby increasing a refrigerant pressure. The diffuser 190d is formed in such a shape that gradually increases a passage area of the refrigerant. The diffuser 190d has a function of decelerating the refrigerant flow to increase the refrigerant pressure, that is, a function of converting a velocity energy of the refrigerant into a pressure energy thereof.

The two-stage decompression ejector 16 of the present embodiment satisfies a relationship indicated by the following formula F1:

$$0.07 \leq Vo \times S/vn \leq 0.7 \tag{F1}$$

where Vo is an intermediate-pressure space volume ($mm^3$) that leads from an outlet of the variable throttle mechanism 18a to an inlet of the second throttle passage 19a (specifically, the throat portion 191a), S is a throttle passage area ($mm^3$) of the throat portion 191a, and vn is a flow velocity (mm/s) of the refrigerant passing through the throat portion 191a during the time from the startup of the cycle to a normal operation thereof. Note that the intermediate-pressure space volume Vo is a volume of a part indicated by dotted hatching shown in FIGS. 1 and 2.

In order to satisfy the above-described formula F1, for example, means for adjusting a passage volume from the outlet of the variable throttle mechanism 18a of the thermal expansion valve 18 to the intermediate-pressure refrigerant outlet 180b, means for adjusting a passage volume from the inlet of the nozzle 191 to the throat portion 191a, or means for directly adjusting a throttle passage area S of the throat portion 191a can be employed. Specifically, the present embodiment ensures the intermediate-pressure space volume Vo of, for example, 300 $mm^3$ or more.

As shown in FIG. 1, the first evaporator 20 is connected to the outlet side of the two-stage decompression ejector 16 (specifically, the outlet side of the diffuser 190d of the ejector 19).

The first evaporator 20 is a heat exchanger for heat absorption which exchanges heat between low-pressure refrigerant passing therethrough and air (inside or outside air) blown by an electric blower 21 to allow the refrigerant to evaporate, thereby exhibiting a heat absorption effect. The electric blower 21 has the same structure as that of the electric blower 13, and includes a centrifugal multiblade fan 21a and an electric motor 21b.

The first evaporator 20 is disposed in a case forming an air passage of an indoor air conditioning unit (not shown) of the air conditioner for the vehicle. The first evaporator 20 constitutes cooling means for cooling air blown into a vehicle compartment through the case. That is, in the present embodiment, the first evaporator 20 is used for air conditioning of the inside of the vehicle compartment, and a space to be conditioned by the first evaporator 20 is the inside of the vehicle compartment.

A heater core (not shown) or the like serving as heating means for heating the air is disposed on the downstream side of the air flow of the first evaporator 20 in the case of the indoor air conditioning unit. The conditioned air whose temperature and humidity are adjusted according to the degree of heating of the heater core is blown out from an air outlet (not shown) on the downstream side end of the air flow in the case into the vehicle compartment.

The low-pressure refrigerant inlet 180c of the two-stage decompression ejector 16 described above is connected to a refrigerant outlet side of the first evaporator 20. The low-pressure refrigerant outlet 180d of the two-stage decompression ejector 16 is connected to the suction side of the compressor 11.

In contrast, the other refrigerant branched at the branch portion 15 flows into a refrigerant suction port 190e of the two-stage decompression ejector 16 via the refrigerant branch passage 17. Throttle means 22 is disposed in the refrigerant branch passage 17, and the second evaporator 23 is disposed on the downstream side of the refrigerant flow away from the throttle means 22. The throttle means 22 serves as decompression means for decompressing and expanding the refrigerant flowing into the second evaporator 23, and specifically, is constructed of a fixed throttle, such as a capillary tube or an orifice.

The second evaporator 23 is a heat exchanger for heat absorption which exchanges heat between low-pressure refrigerant passing therethrough and air blown by an electric blower 24 to allow the refrigerant to evaporate, thereby exhibiting a heat absorption effect. The electric blower 24 has the same structure as that of each of the electric blowers 13 and 21, and includes a centrifugal multiblade fan 24a and an electric motor 24b.

The second evaporator 23 constitutes cooling means for cooling air blown into a refrigerator provided in the vehicle compartment. That is, in the present embodiment, the second evaporator 23 is used for cooling the inside of the refrigerator, and a space to be conditioned by the second evaporator 23 (a space to be cooled) is the inside of the refrigerator. The electric blower 24 sucks air in the refrigerator to allow the air to circulate and be blown toward the second evaporator 23.

Now, the operation of the present embodiment with the above-described arrangement will be described below. When a rotation driving force is transmitted from the vehicle engine to the compressor 11, the compressor 11 sucks, compresses, and discharges the refrigerant. The high-temperature gas-phase refrigerant discharged from the compressor 11 is cooled and condensed at the radiator 12 by use of the outside air blown from the electric blower 13.

The condensed refrigerant is separated into gas and liquid phases by the receiver 14. The saturated liquid-phase refrigerant flowing from the receiver 14 is divided into a refrigerant flow directed toward the high-pressure refrigerant inlet 180a of the two-stage decompression ejector 16 and a refrigerant flow directed to the refrigerant branch passage 17 by the branch portion 15.

The refrigerant flow into the two-stage decompression ejector 16 is decompressed and expanded by the variable throttle mechanism 18a of the thermal expansion valve 18 to flow from the intermediate-pressure refrigerant outlet 180b into the nozzle 191 of the ejector 19. At this time, the variable throttle mechanism 18a has a throttle passage area adjusted such that the superheat degree of the refrigerant on the outlet side of the first evaporator 20 is within the predetermined range. Further, the refrigerant decompressed and expanded by the variable throttle mechanism 18a has a boiling nucleus formed therein.

The refrigerant flowing into the nozzle 191 of the ejector 19 is decompressed and expanded by the second throttle passage 19a of the nozzle 191. Thus, the pressure energy of the refrigerant is converted into the velocity energy thereof at the nozzle 191, allowing high-velocity refrigerant to be injected from the refrigerant injection port 191b. At this time, the refrigerant suction effect sucks the refrigerant having passed through the second evaporator 23 thereinto from the refrigerant suction port 190e.

The injection refrigerant injected from the refrigerant injection port 191b and the suction refrigerant drawn from the refrigerant suction port 190e are mixed by the mixing portion 190c on the downstream side of the nozzle 191 to flow into the diffuser 190d. In the diffuser 190d, an increase in passage area converts the velocity (expansion) energy of the refrigerant into the pressure energy, resulting in an increase in pressure of the refrigerant.

The refrigerant flowing from the diffuser 190d of the two-stage decompression ejector 16 flows into the first evaporator 20. In the first evaporator 20, the low-pressure refrigerant absorbs heat from the air blown from the electric blower 21 to evaporate. Thus, the air to be blown into the vehicle compartment is cooled.

The refrigerant having passed through the first evaporator 20 flows again into the low-pressure refrigerant inlet 180 of the two-stage decompression ejector 16, and flows out from the low-pressure refrigerant outlet 180d via the communication chamber 180g. Then, the refrigerant is drawn into the compressor 11, and again compressed.

In contrast, the refrigerant flow into the refrigerant branch passage 17 is decompressed by the throttle means 22 to become a low-pressure refrigerant, and the low-pressure refrigerant flows into the second evaporator 23. In the second evaporator 23, the low-pressure refrigerant absorbs heat from the air blown from the electric blower 24 to evaporate. Thus, the air to be blown into the refrigerator is cooled. The refrigerant having passed through the second evaporator 23 is drawn from the refrigerant suction port 190e into the two-stage decompression ejector 16.

In the present embodiment, the refrigerant cycle device 10 is operated as described above, so that the first and second evaporators 20 and 23 can exhibit the cooling effect at the same time. At that time, a refrigerant evaporation pressure of the first evaporator 20 is a pressure increased by the diffuser 14, while a refrigerant evaporation pressure of the second evaporator 23 is a pressure directly decompressed by the nozzle 191.

Accordingly, it is possible to lower the refrigerant evaporation pressure (refrigerant evaporation temperature) of the second evaporator 23 with respect to the refrigerant evaporation pressure (refrigerant evaporation temperature) of the first evaporator 20. In the present embodiment, the first evaporator 20 is used for air conditioning of the inside of the vehicle compartment, while the second evaporator 23 is used for cooling the inside of the refrigerator, so that a cooling temperature for the freezer and refrigerator mounted on the vehicle can be lower than a cooling temperature for the inside of the vehicle compartment.

The downstream side of the first evaporator 20 is connected to the suction side of the compressor 11, so that the refrigerant whose pressure is increased by the diffuser 190d can be drawn into the compressor 11. As a result, the suction pressure of the compressor 11 can be increased to decrease a driving power of the compressor 11, thereby improving the COP.

Furthermore, since the present embodiment employs the two-stage decompression ejector 16, the refrigerant is decompressed and expanded by the variable throttle mechanism 18a of the thermal expansion valve 18, and then the intermediate-pressure refrigerant with the boiling nucleus formed therein can flow into the nozzle 191 of the ejector 19. This can promote boiling of the refrigerant under reduced pressure in the nozzle 191 to improve the nozzle efficiency of the ejector 19. As a result, the COP of the ejector-type refrigeration cycle device 10 can be effectively improved.

Furthermore, in the present embodiment, the intermediate-pressure space volume Vo, the throttle passage area S, and the flow velocity vn have the relationship indicated by the above-described formula F1. As mentioned above with reference to FIGS. 8 to 11, the low-frequency abnormal noise generated in the two-stage decompression ejector on startup of the cycle device 10 can be reduced without losing the effect of improving the nozzle efficiency.

As mentioned above, only the adjustment of the intermediate-pressure space volume Vo and the throttle passage area S can easily satisfy the formula F1. Thus, the two-stage decompression ejector 16 can be constructed of the simple structure including the thermal expansion valve 18 and the ejector 19 which are integrally connected together.

Second Embodiment

Figure 3:
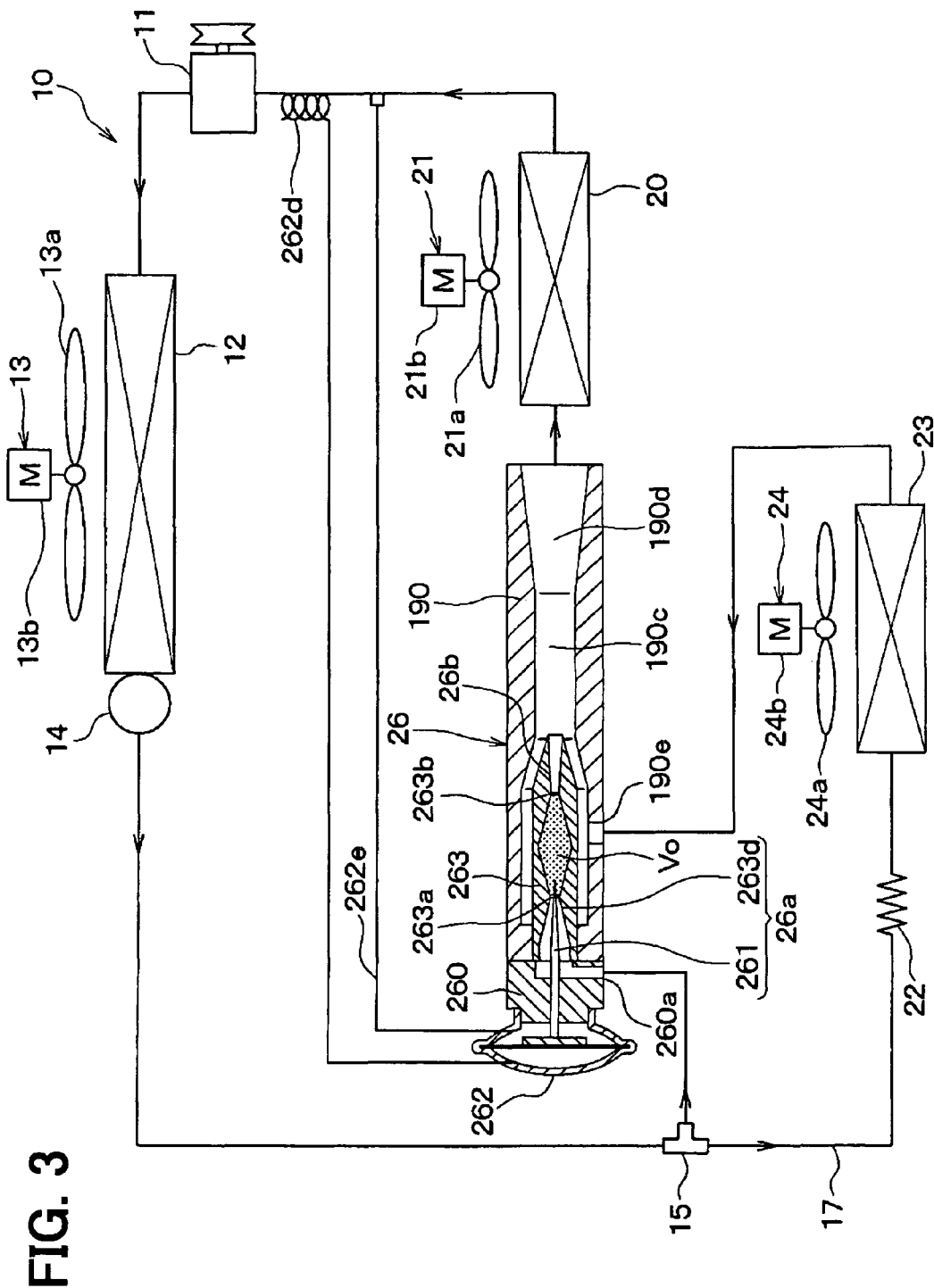
FIG. 3 is a diagram showing the entire configuration of an ejector-type refrigeration cycle device according to a second embodiment of the invention.
Figure 4:
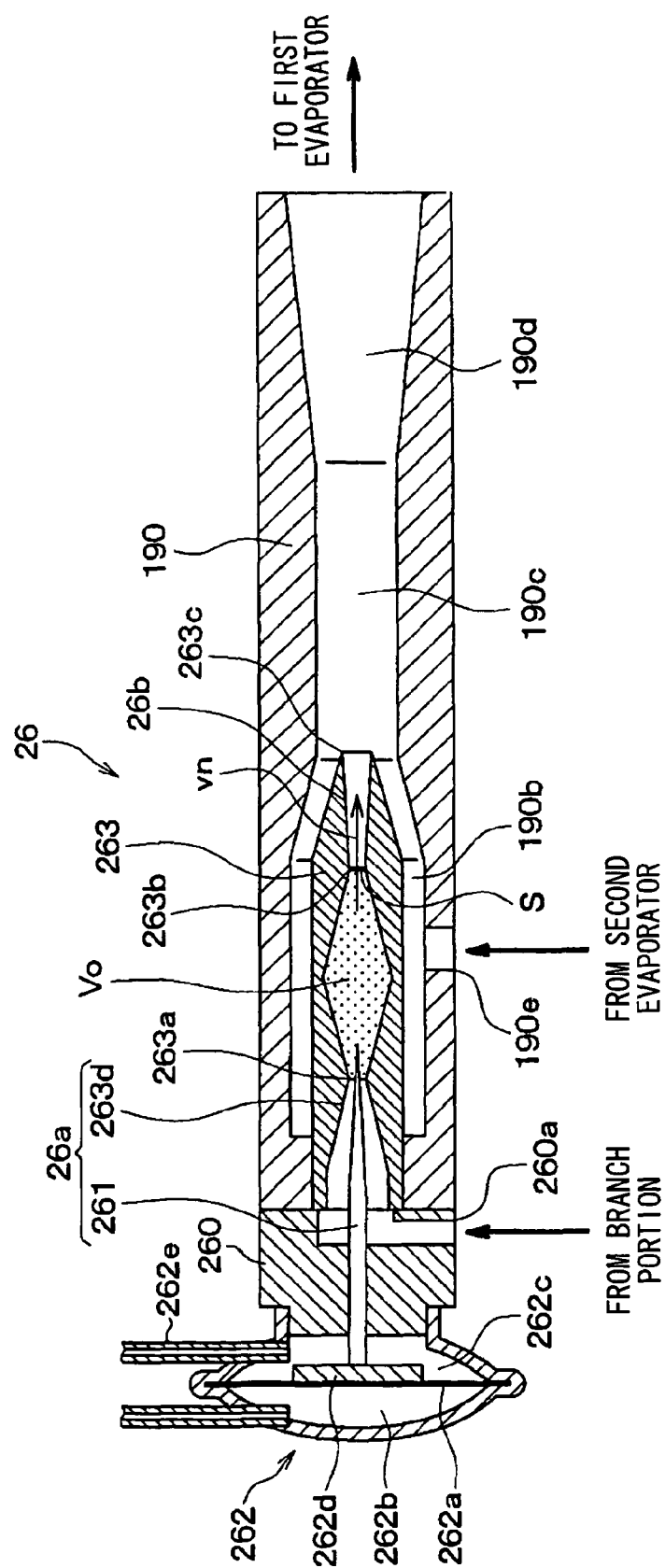
FIG. 4 is a sectional view of a two-stage decompression ejector in the second embodiment.

In the first embodiment, the thermal expansion valve 18 and the ejector 19 are integrally connected together to form the two-stage decompression ejector 16. Alternatively, in the present embodiment, a thermal expansion valve and an ejector are integrally formed as shown in FIGS. 3 and 4 thereby to construct a two-stage decompression ejector 26. FIGS. 3 and 4 illustrate the same or equivalent components as those of the first embodiment by the same reference numerals. The same goes for the following drawings.

FIG. 3 is a diagram showing the entire configuration of the ejector-type refrigeration cycle device 10 of the present embodiment. FIG. 4 is a sectional view of the two-stage decompression ejector 26. The two-stage decompression ejector 26 of the present embodiment includes a housing 260 corresponding to the thermal expansion valve 18 of the first embodiment, a needle valve 261, a temperature sensing portion 262, a body 190 corresponding to the ejector 19 of the first embodiment, and a nozzle 263.

The housing 260 is provided with a high-pressure refrigerant inlet 260a for allowing one refrigerant branched by the branch portion 15 to flow thereinto. The high-pressure refrigerant inlet 260a is in communication with the inlet side of the nozzle 263. The temperature sensing portion 262 attached to the housing 260 includes a diaphragm 262a which is the same as that of the first embodiment, a first pressure chamber 262b, a second pressure chamber 262c, and a disc-like member 262d.

The first pressure chamber 262b is connected to a temperature sensing cylinder 262d for detecting a temperature of refrigerant on the outlet side of the first evaporator 20 as shown in FIG. 3. Thus, the internal pressure of the first pressure chamber 262b is a saturated evaporation pressure of the refrigerant according to the temperature of the refrigerant on the outlet side of the first evaporator 20. The refrigerant on the outlet side of the first evaporator 20 is guided to the second pressure chamber 262c via an equalizing pipe 262e. Thus, the internal pressure in the second pressure chamber 262 is a pressure of the refrigerant on the outlet side of the first evaporator 20.

The disc-like member 262d bonded to the side of the second pressure chamber 262c of the diaphragm 262 is connected to the needle valve 261 formed in a needle-like shape. The needle valve 261 penetrates the inside of the housing 260 to extend up to the downstream side in the refrigerant flow direction away from a first throat portion 263a in a refrigerant passage of the nozzle 263.

The nozzle 263 of the present embodiment and the nozzle 191 of the first embodiment basically have the same structure, but differ in shape of the refrigerant passage therein. That is, the inner diameter of the refrigerant passage of the nozzle 263 is gradually reduced and then gradually increased along the refrigerant flow direction from the inlet. Thereafter, the inner diameter of the refrigerant passage is gradually reduced and then gradually increased to reach a refrigerant injection port 263c.

Thus, two throat portions, namely, a first throat portion 263a and a second throat portion 263b are formed from the upstream side in the refrigerant flow direction in the nozzle 263. As mentioned above, the tip of the needle valve 261 extends up to the downstream side in the refrigerant flow direction away from the first throat portion 263a. Thus, the needle valve 261 is displaced in cooperation with the diaphragm 262a thereby to adjust a throttle passage area of the first throat portion 263a.

Thus, in the present embodiment, the refrigerant passage 263d on the upstream side of the first throat portion 263a (first throttle passage) and the needle valve 261 constitute a variable throttle mechanism 26a. More specifically, the housing 260, the needle valve 261, the temperature sensing portion 262, and the first throat portion 263a constitute an external equalizing expansion valve for adjusting a throttle passage area (refrigerant flow amount) such that the superheat degree of the refrigerant on the outlet side of the first evaporator 20 is within the predetermined range.

An internal equalizing expansion valve may be constructed by guiding the refrigerant on the outlet side of the first evaporator 20 to the second pressure chamber 262c. And, a second throttle passage 26b is formed by a refrigerant passage after the second throat portion 263b having the minimum refrigerant passage sectional area among refrigerant passages on the downstream side of the variable throttle mechanism 26a.

Also, in the two-stage decompression ejector 26 of the present embodiment, an intermediate-pressure space volume Vo ($mm^3$) from an outlet of the variable throttle mechanism 26a to an inlet of the second throttle passage 26b (specifically, the second throat portion 263b), a throttle passage area S ($mm^2$) of the second throat portion 263b, and a flow velocity vn (mm/s) of the refrigerant passing through the second throat portion 263b during the time from the startup of the cycle to a normal operation thereof satisfy the relationship indicated by the above-described formula F1.

The intermediate-pressure space volume Vo in the present embodiment is a volume of a part indicated by dotted hatching shown in FIGS. 3 and 4.

Thus, like the first embodiment, the operation of the ejector-type refrigeration cycle device 10 of the present embodiment can also suppress the low-frequency abnormal noise generated in the two-stage decompression ejector on startup of the cycle device 10, and can further effectively improve the COP without loosing the effect of improving the nozzle efficiency. The thermal expansion valve and the ejector are integrally formed thereby to make the two-stage decompression ejector compact.

Third Embodiment

Figure 5:
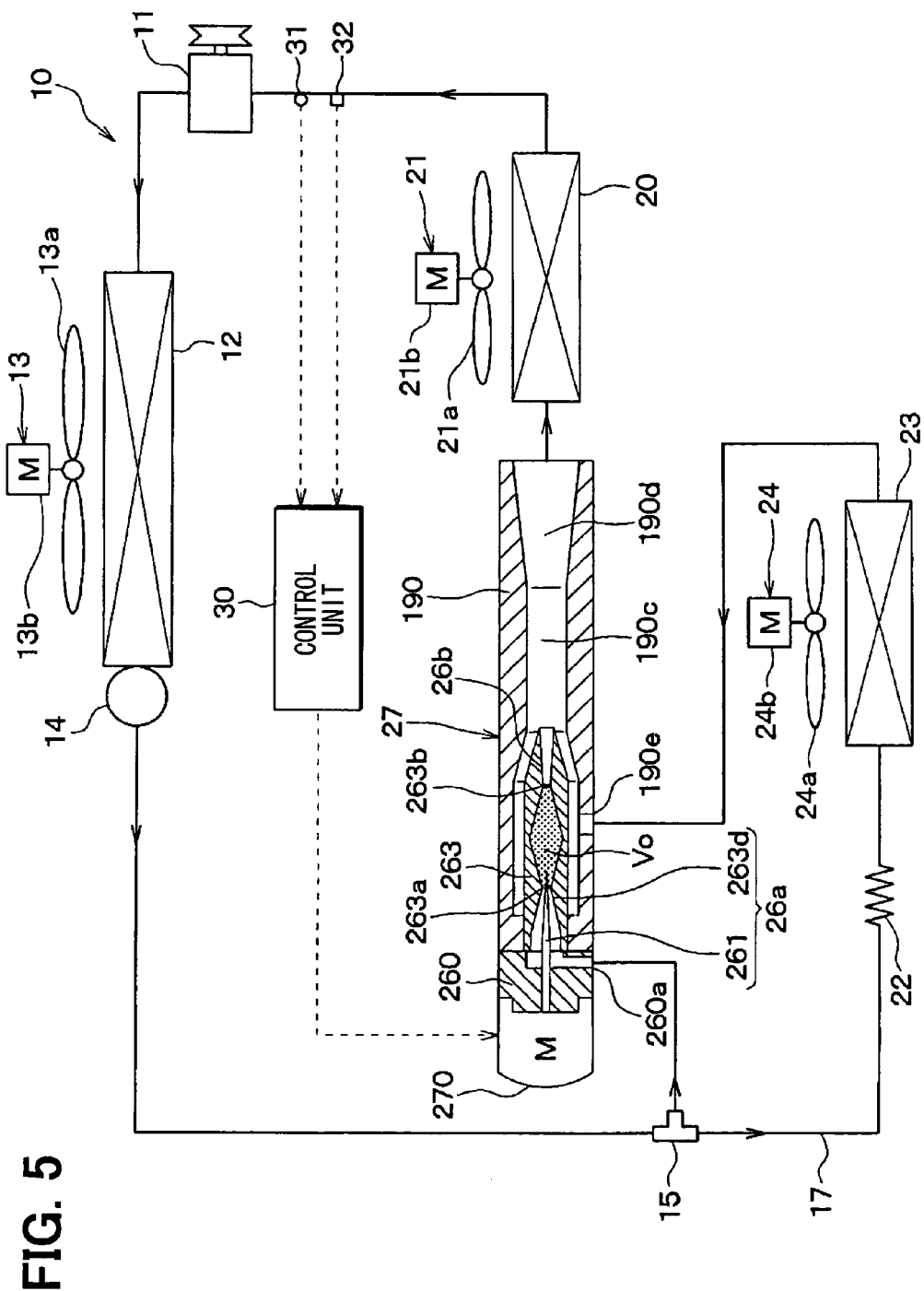
FIG. 5 is a diagram showing the entire configuration of an ejector-type refrigeration cycle device according to a third embodiment of the invention.

In the second embodiment, the two-stage decompression ejector 26 operates the needle valve 261 by use of the temperature sensing portion 262 serving as a superheat-degree actuated mechanism to adjust a throttle passage area of the variable throttle mechanism 26a such that the superheat degree of the refrigerant on the outlet side of the first evaporator 20 becomes a predetermined value. In the present embodiment, as shown in the entire configuration diagram of FIG. 5, a two-stage decompression ejector 27, which can electrically control the operation of the needle valve 261, is used.

In the two-stage decompression ejector 27 of the present embodiment, the needle valve 261 is driven by an electric actuator 270. As the electric actuator 270, for example, a motor actuator, such as a stepping motor, or an electromagnetic solenoid mechanism can be employed.

The electric actuator 270 is driven and controlled by a control signal output from a controller 30. The controller 30 includes a known microcomputer, including a CPU, a ROM, a RAM, and the like, and a peripheral circuit thereof. The controller 30 controls the operation of the electric actuator 270 by executing various kinds of computation and processing based on control programs stored in the ROM.

A temperature sensor 31 for detecting the temperature of refrigerant on the outlet side of the first evaporator 20 and a pressure sensor 32 for detecting the pressure thereof are connected to the input side of the controller 30. The controller 30 calculates a superheat degree of the refrigerant on the outlet side of the first evaporator 20 based on signals from these sensors 31 and 32, and controls the operation of the electric actuator 270 such that the calculated degree is within a predetermined range.

Accordingly, the throttle passage area of the variable throttle mechanism constructed of the first throat portion 263a and the needle valve 261 can be adjusted. The structures of other components are the same as those of the second embodiment. Thus, the operation of the ejector-type refrigeration cycle device 10 of the present embodiment can also obtain completely the same effect as that in the second embodiment.

Other Embodiments

The present invention is not limited to the embodiments described above, and various modifications can be made to those embodiments as follows.

(1) In the above-described embodiments, the variable throttle mechanism 18a or 26a is disposed as the upstream side throttle, and the second throttle passage 19a or 26b serving as a fixed throttle is disposed as the downstream side throttle. In contrast, as mentioned above, the low-frequency abnormal noise generated on startup of the ejector refrigeration cycle can be suppressed by changing the intermediate-pressure space volume Vo and the amount of air bubbles (boiling nuclei) existing in the intermediate-pressure space.

Accordingly, provision of the fixed throttle as the upstream side throttle and of the variable throttle mechanism as the downstream side throttle can suppress the low-frequency abnormal noise described above. That is, special attention may be paid to the intermediate-pressure space volume Vo, the throttle passage area S of the variable throttle mechanism indicative of a parameter representing the amount of air bubbles existing in the intermediate-pressure space, and the flow velocity vn of the refrigerant passing through the variable throttle mechanism or the like.

Figure 6:
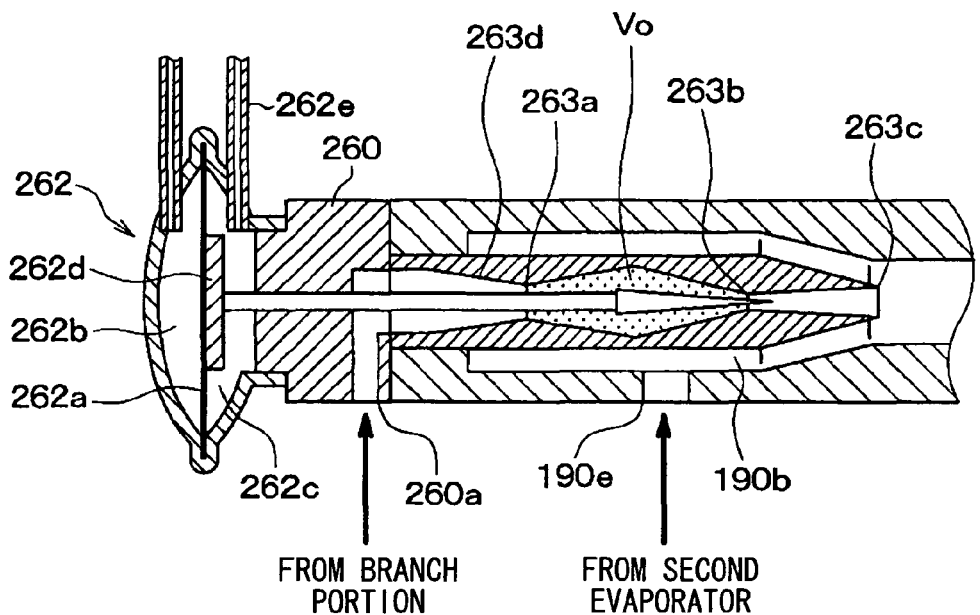
FIG. 6 is a sectional view showing a part of a two-stage decompression ejector according to another embodiment.
Figure 7:
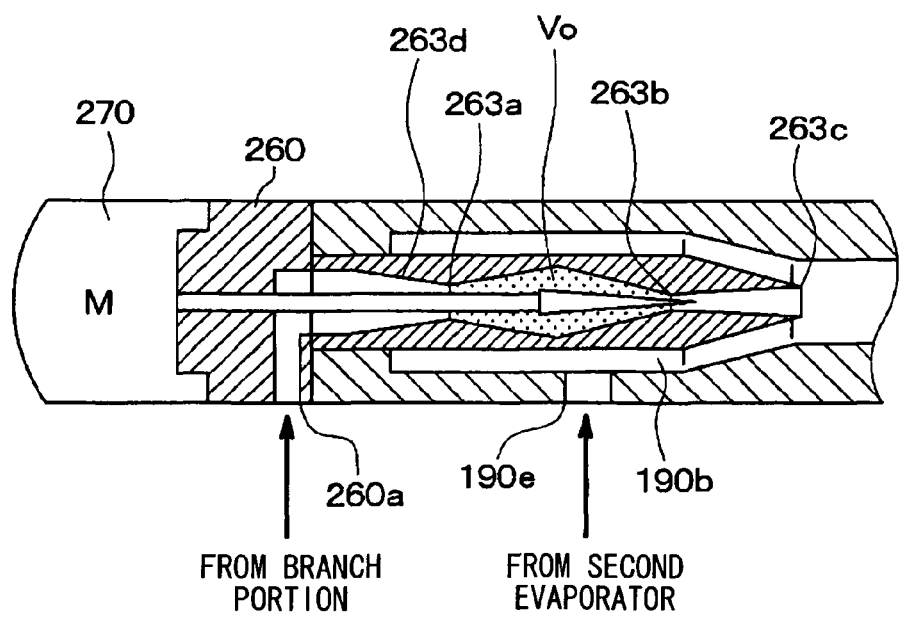
FIG. 7 is a sectional view showing a part of a two-stage decompression ejector according to further another embodiment.
Figure 8:
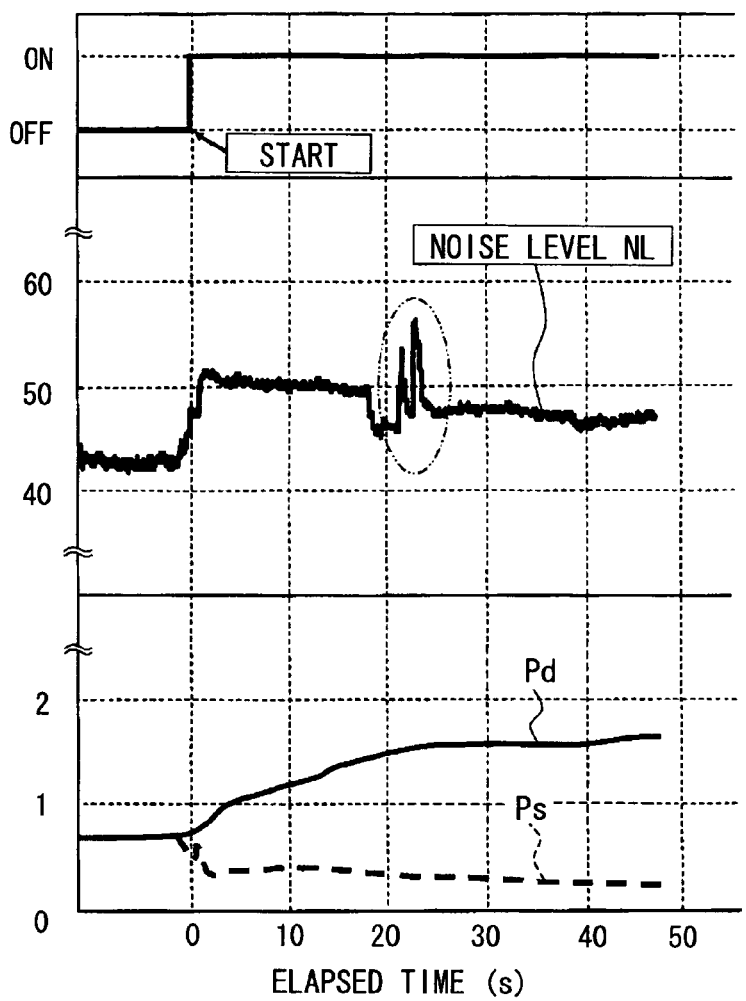
FIG. 8 is a graph showing changes with time in high-pressure side refrigerant pressure, low-pressure side refrigerant pressure, noise level, and operating state.
Figure 9:
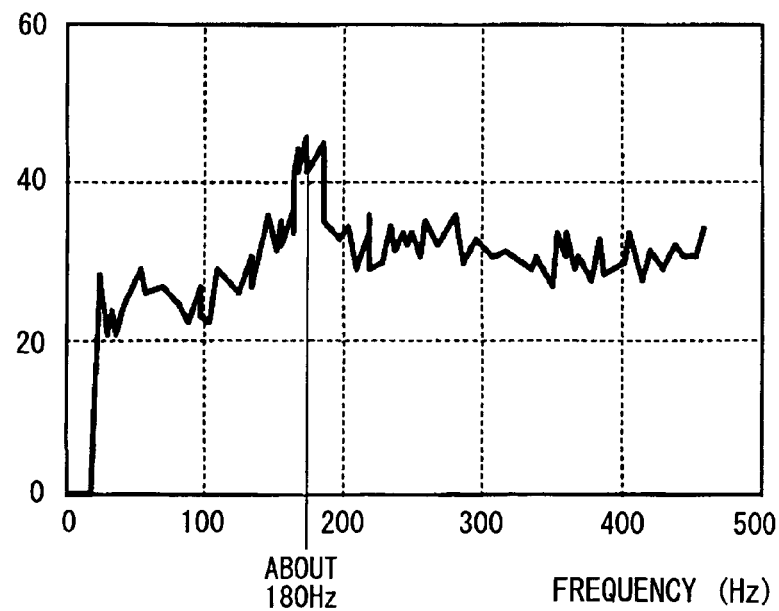
FIG. 9 is a graph showing the analytical result of frequency of the noise level.
Figure 10:
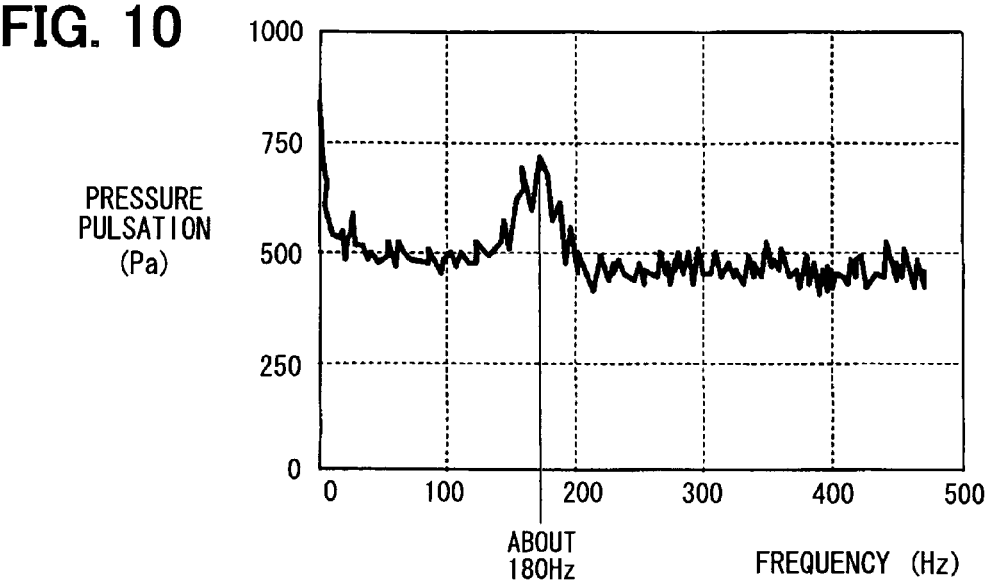
FIG. 10 is a graph showing the analytical result of frequency of pressure pulsation of intermediate-pressure refrigerant.
Figure 11:
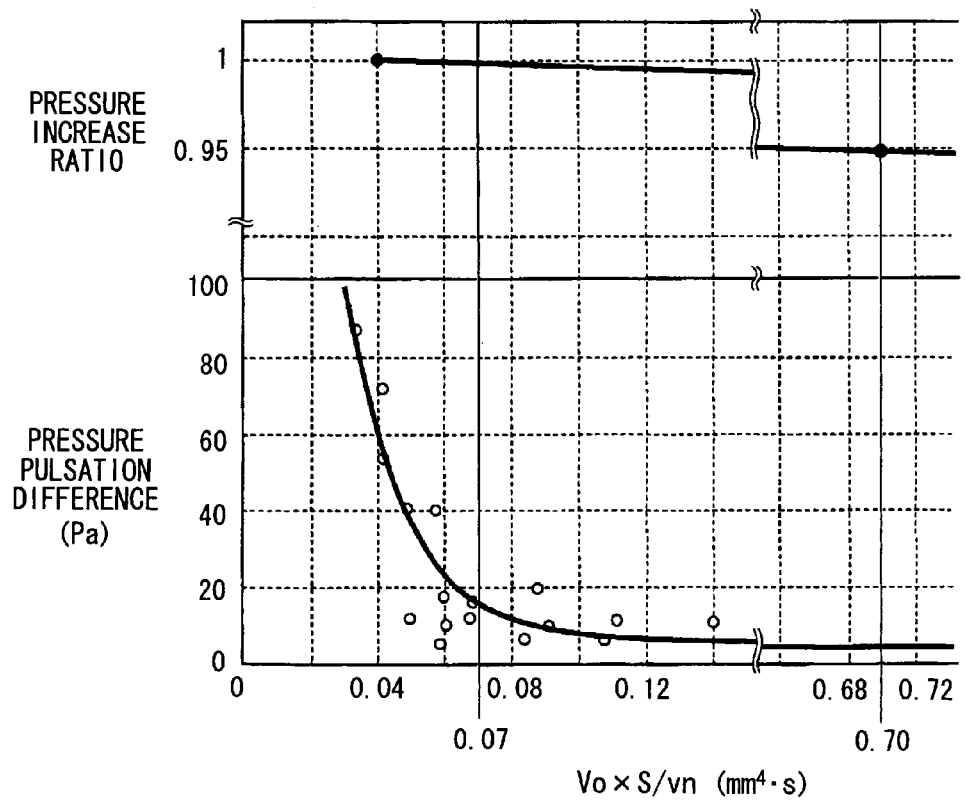
FIG. 11 is a graph showing a relationship among Vo×S/vn, a difference in pressure pulsation, and a ratio of the increase in pressure.

Specifically, the two-stage decompression ejector structure can have, for example, a structure shown in FIGS. 6 and 7. FIGS. 6 and 7 are enlarged sectional views showing parts around the nozzles 263 of the second and third embodiments. That is, a tapered portion at the tip of the needle valve 261 is disposed to extend up to the downstream side of the second throat portion 263b, and the needle valve 261 is displaced thereby to adjust the throttle passage area of the second throat portion 263b.

On the other hand, even in the displacement of the needle valve 261, only a linear part of the needle valve 261 is displaced inside the first throat portion 263a, which does not change the throttle passage area of the first throat portion 263a. This can easily achieve the structure including the fixed throttle as the upstream side throttle, and the variable throttle mechanism as the downstream side throttle.

(2) In the above-described embodiments, the ejector-type refrigeration cycle device 10 has been described in which the branch portion 15 is disposed on the upstream side of the two-stage decompression ejector 16, 26, or 27. The cycle structure to which the invention is applied is not limited thereto.

For example, the receiver 14 may be removed, such that the refrigerant flowing from the radiator 12 directly flows into the two-stage decompression ejector 16, 26, or 27, and the liquid-phase refrigerant flowing from a gas-liquid separator disposed on the downstream side of the decompression ejector 16, 26, or 27 is drawn into the ejector 16, 26, or 27.

A branch portion for branching the refrigerant flow from the diffuser 190d may be provided on the downstream side of the two-stage decompression ejector 16, 26 or 27. The branched refrigerant may be respectively supplied to the first evaporator 20 and the second evaporator 23.

(3) In the above-described embodiments, different spaces to be cooled are cooled by using the first evaporator 20 and the second evaporator 23. The first evaporator 20 and the second evaporator 23 may cool the same space to be cooled.

At this time, the air blown into the space to be cooled may be cooled in the first evaporator 20 and the second evaporator 23 in that order. In this way, the first evaporator 20 is disposed on the windward side, and the second evaporator 23 whose refrigerant evaporation temperature is lower than that of the first evaporator 20 is disposed on the leeward side. Thus, a difference in temperature between the blown air and the first and second evaporators 20 and 23 can be ensured, thereby effectively cooling the blown air.

(4) In the above-described embodiments, an internal heat exchange for exchanging heat between high-pressure refrigerant on the downstream side of the radiator 12 and low-pressure refrigerant to be drawn into the compressor 11 may be further provided. Accordingly, it is possible to increase a difference in enthalpy (cooling capacity) of the refrigerant between an inlet and an outlet of the refrigerant in the first and second evaporators 20 and 23, thereby further improving the COP.

(5) Although in the above-described embodiments, the structures of the radiator 12 and the receiver 14 are not described in detail, the radiator 12 or the receiver 14 may be integrally or separately formed.

As the radiator 12, a so-called sub-cool type condenser may be employed which includes a heat exchanging portion for condensing refrigerant, a receiver for separating the refrigerant introduced from the exchanging portion into liquid and gas phases, and a heat exchanging portion for super-cooling a saturated liquid-phase refrigerant from the receiver. The receiver 14 can be omitted.

(6) In the above-described embodiment, the ejector-type refrigeration cycle device to which the two-stage decompression ejector of the invention is applied is used for an air conditioner for the vehicle, but the invention is not limited to the application as described above. For example, the invention can be applied to fixed refrigeration cycles, such as a household refrigerator, a refrigeration system for an automatic dispenser, or a showcase with a refrigeration function.

(7) In the above-described embodiment, the radiator 12 is applied as the outdoor side heat exchanger for exchanging heat between the refrigerant and the outside air, and the first and second evaporators 20 and 23 are applied as the indoor side heat exchanger for cooling the inside of the vehicle compartment and the refrigerator. Conversely, the invention may be applied to a heat pump cycle in which the first and second evaporators 20 and 23 are constructed as the outdoor side heat exchanger for absorbing heat from a heat source, such as outside air, and the radiator 12 is constructed as the indoor side heat exchanger for heating a fluid to be heated, such as air or water.

Such changes and modifications are to be understood as being within the scope of the present invention as defined by the appended claims.

What is claimed is:

1. A two-stage decompression ejector comprising:
   a variable throttle mechanism including a first throttle passage configured to decompress and expand a fluid and a valve body configured to change a throttle passage area of the first throttle passage;
   a nozzle having therein a second throttle passage, the second throttle passage being adapted to further decompress and expand the fluid decompressed by the variable throttle mechanism; and
   a suction portion configured to draw a fluid by a suction effect of a jet-flow fluid ejected at a high velocity from the nozzle,
   wherein the following formula is satisfied:

$$0.07 \leq Vo \times S/vn \leq 0.7$$

where Vo is an intermediate-pressure space volume (mm$^3$) that is a volume from an outlet of the variable throttle mechanism to an inlet of the second throttle passage, S is a throttle passage area (mm$^2$) that is a passage sectional area of a minimum passage sectional area portion of the second throttle passage, and vn is a flow velocity (mm/s) of the fluid passing through the minimum passage sectional area portion.

2. The two-stage decompression ejector according to claim 1, wherein the first throttle passage and the second throttle passage are formed in a fluid passage of the nozzle, and
   wherein the valve body is configured to change only a throttle passage area of a minimum passage sectional portion in the first throttle passage.

3. The two-stage decompression ejector according to claim 1, wherein the variable throttle mechanism includes a throttle passage of a thermal expansion valve, and a valve body.

4. The two-stage decompression ejector according to claim 1, wherein the variable throttle mechanism includes an electric variable throttle mechanism adapted to be capable of electrically controlling an operation of the valve body.

5. An ejector-type refrigeration cycle device comprising the two-stage decompression ejector according to claim 1.

* * * * *